UNITED STATES PATENT OFFICE.

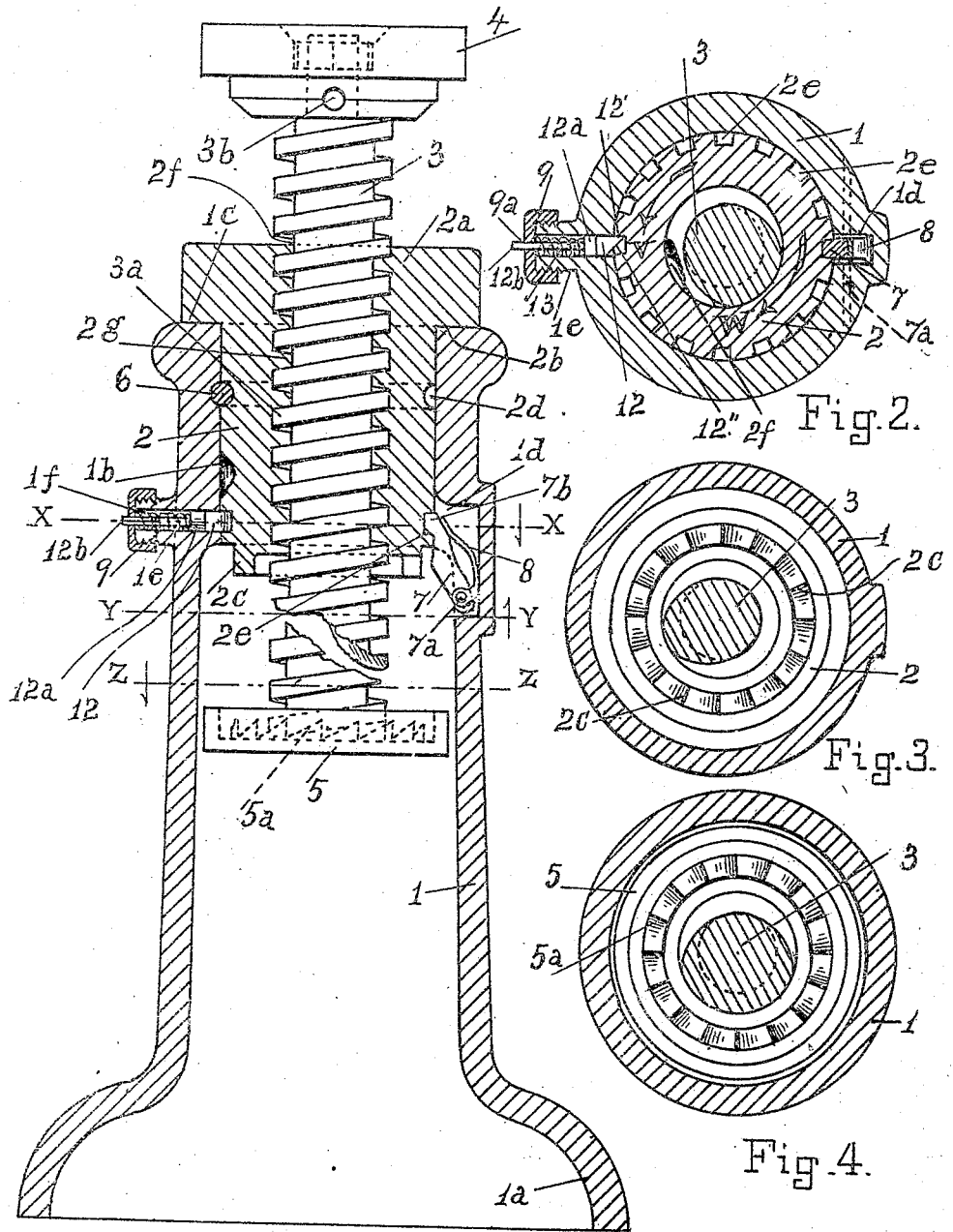

SAMUEL E. MOORE, OF WILLIAMSVILLE, ILLINOIS.

JACK 1,171,626.

Specification of Letters Patent.　　Patented Feb. 15, 1916.

Application filed April 26, 1915. Serial No. 23,897.

*To all whom it may concern:*

Be it known that I, SAMUEL E. MOORE, a citizen of the United States, residing at Williamsville, in the county of Sangamon and State of Illinois, have invented a new and useful Improvement in Jacks, of which the following is a specification.

The invention relates to jacks of the type which embody a stand, a rotative screw and a bushing or sleeve co-acting with the screw.

The general purpose of the invention is to provide a strong and effective jack which may be made at a low first cost and will not be subject to breaking or injury by reason of turning the screw too far upward.

More specific purposes are: to provide in connection with the stand, a bushing normally at rest and adapted to sustain the screw, but capable of rotation with the screw; to provide a latch on the stand normally effective to hold the bushing at rest and adapted to be released to permit rotation of the bushing; to provide a controlling device in connection with the screw and effective to operate the latch before the screw reaches the limit of its upward movement; to provide clutch members on the screw and the bushing, adapted to engage with each other to cause the bushing to rotate with the screw and thereby prevent excessive upward movement of the screw; and to provide means to prevent the rotation of the bushing during the first downward movement of the screw until such time as the latch comes into action.

The invention is illustrated in the annexed drawing, to which reference is hereby made.

Figure 1 is a partial vertical longitudinal section through a jack embodying my invention, the screw being shown in elevation. Fig. 2 is a horizontal transverse section through the jack on the line X. X. of Fig. 1. Fig. 3 is a horizontal transverse section through the jack on the line Y. Y. of Fig. 1, and Fig. 4 is a horizontal transverse section through the stand and the screw on the line Z. Z. of Fig. 1.

Similar reference characters designate like parts in the different views.

The main structure is preferably of cast iron, but any other suitable material may be used.

The stand 1 is preferably of the form shown, having a wide base, $1^a$. The stand has in its upper part, a longitudinal circular bore $1^b$, adapted to accommodate a rotative bushing.

A cylindrical bushing 2 is adapted to rotate in the bore $1^b$ of the stand 1. The bushing has an integral circular head $2^a$, having a flat lower surface $2^b$, contacting with the flat upper end $1^c$ of the stand 1. At the lower end of the bushing is a clutch member integral with the bushing and having a circular series of inclined teeth $2^c$. The bushing also has a circumferential groove $2^d$, a circumferential series of notches $2^e$ and a central longitudinal bore $2^f$ having integral screw threads $2^g$ matching the threads of the screw 3. The screw 3 has threads $3^a$, matching the threads $2^g$, and transverse holes $3^b$ to receive an instrument for turning the screw. A head 4 is rotative on the upper end of the screw 3. A disk 5 is rigidly connected with the lower end of the screw 3. On the upper side of the disk is an integral clutch member having a circular series of inclined teeth $5^a$ adapted to engage with the teeth $2^c$ at the lower end of the bushing 2.

A pin 6 extending transversely through the upper part of the stand 1 is approximately tangential to the inner circumference of the circular groove $2^d$. The pin prevents longitudinal movement of the bushing. The radius of the pin is slightly less than the radius of the groove in order that the pin may not hinder free rotation of the bushing.

A latch 7, located in a suitable recess or chamber $1^d$ in the stand 1, is oscillative on a transverse pin $7^a$. The latch extends inwardly and is inclined upwardly as shown. The latch has at its upper end a tongue $7^b$ adapted to engage in the notches $2^e$ of the bushing 2 to prevent rotation of the bushing. A spring 8 acts on the latch to keep the tongue $7^b$ in any one of the notches $2^e$.

The stand 1 has a boss $1^e$ provided with a bore $1^f$, radial to the stand. The outer end of the boss is screw threaded. A cap 9 screws onto the boss $1^e$ and has a central hole $9^a$ in which the stem $12^b$, of the click, slides. The click is preferably of steel and comprises a blade 12, a piston $12^a$ and a stem $12^b$, preferably in one piece. The blade 12 has a flat edge $12'$, adapted to be engaged by one wall of any notch $2^e$ to prevent the bushing 2 from turning with the screw 3 during the first part of the downward movement of the screw, before the clutch teeth $5^a$ become disengaged from the teeth $2^c$, and the latch 7 comes into action. The blade 12 also has an inclined edge 12″, adapted to be engaged by one wall of any notch 2ᵉ to slide the click outward so that it will not prevent the rotation of the bushing when the teeth 5ᵃ are disengaged from the teeth 2ᶜ. A spring 13 acts against the piston 12ᵃ to slide the click inward.

The operation of the jack is as follows: The jack being set, if the screw be turned upward nearly to the predetermined limit, the edge of the disk 5, moving upwardly with the screw will engage on the lower inclined edge of the latch and move the latch to withdraw the tongue 7ᵇ from the notch 2ᵉ, and immediately following the complete withdrawal of the tongue, the teeth 5ᵃ will engage the teeth 2ᶜ to cause the bushing to rotate with the screw and prevent any further upward movement of the screw, thus preventing the stripping of the threads of the screw or other accident which might result from excessive upward turning of the screw. During this rotation of the bushing the walls of the notches 2ᶜ will engage the inclined edge 12″ of the blade 12 to cause retraction of the click so that the click will not prevent the bushing from rotating in the direction indicated by the arrow W, Fig. 2. Upon starting the screw to turn downward, there is risk that the screw might stick in the bushing so that the bushing would turn with the screw and thus prevent disengagement of the teeth 5ᵃ from the teeth 2ᶜ, if some means were not provided to obviate this difficulty. If the screw should stick in the bushing, the first partial rotation of the bushing in the direction indicated by the arrow V, Fig. 2, would cause the wall of the nearest notch 2ᵉ, approaching the click, to strike against the flat edge 12′ of the blade 12, and thus stop the rotation.

Having fully described my invention, what I claim as new and desire to secure by Letters Patent is:

1. In a jack, the combination of a stand, a bushing adapted to rotate in the stand, a screw rotative in the bushing, a holding device normally effective to prevent rotation of the bushing during predetermined upward turning of the screw, and means for releasing said holding device to permit the bushing to rotate with the screw.

2. In a jack, the combination of a stand, a bushing rotative clockwise and counter clockwise in the stand, a screw rotative in the bushing, and means adapted to prevent rotation of the bushing in one direction and adapted to permit rotation of the bushing in the opposite direction.

3. In a jack, the combination of a stand, a bushing rotative in the stand and having a clutch member, and a screw rotative in the bushing and having a clutch member complemental to the clutch member of the bushing and engaging therewith to cause the screw and the bushing to rotate together.

4. In a jack, the combination of a stand, a bushing mounted on and rotative in the stand and having a circumferential series of notches, a latch adapted to engage in any notch of said series of notches to prevent rotation of the bushing in either direction; means for releasing said latch; and a click adapted to engage in any notch of said series of notches to stop rotation of the bushing in one direction when the latch is disengaged and adapted to permit rotation of the bushing in the opposite direction when the latch is disengaged.

5. In a jack, the combination of a stand, a bushing mounted on the upper end of the stand and rotative in the stand and having a circumferential series of notches, and also having a clutch member, a latch adapted to engage in any notch of said series of notches, a screw rotative in the bushing, and a disk connected with the screw and having a clutch member complemental to the clutch member of the bushing, said disk being effective to release the latch immediately before complete engagement of the clutch members.

In witness whereof, I have hereunto signed my name, at Springfield, Illinois, this 24th day of February 1915.

SAMUEL E. MOORE.

Witnesses:
ARTHUR L. POORMAN,
HAZEL E. SMITH.